(12) United States Patent
Stoschek et al.

(10) Patent No.: US 11,815,915 B2
(45) Date of Patent: Nov. 14, 2023

(54) SYSTEMS AND METHODS FOR CALIBRATING VEHICULAR SENSORS

(71) Applicant: A3 by Airbus LLC, Sunnyvale, CA (US)

(72) Inventors: Arne Stoschek, Palo Alto, CA (US); Zachary Lovering, Sunnyvale, CA (US)

(73) Assignee: A'by Airbus LLC, Sunnyvale, CA (US)

(*) Notice: Subject to any disclaimer, the term of this patent is extended or adjusted under 35 U.S.C. 154(b) by 335 days.

(21) Appl. No.: 16/499,078

(22) PCT Filed: Mar. 31, 2017

(86) PCT No.: PCT/US2017/025592
§ 371 (c)(1),
(2) Date: Sep. 27, 2019

(87) PCT Pub. No.: WO2018/182737
PCT Pub. Date: Oct. 4, 2018

(65) Prior Publication Data
US 2021/0089058 A1    Mar. 25, 2021

(51) Int. Cl.
*G05D 1/10* (2006.01)
*G01S 7/497* (2006.01)
(Continued)

(52) U.S. Cl.
CPC .............. *G05D 1/106* (2019.05); *G01S 7/497* (2013.01); *G01S 17/931* (2020.01); *G01S 17/933* (2013.01)

(58) Field of Classification Search
None
See application file for complete search history.

(56) References Cited

U.S. PATENT DOCUMENTS 5,955,941 A * 9/1999 Pruksch ............... B60W 30/16
701/91
2003/0076415 A1   4/2003 Strumolo
(Continued)

FOREIGN PATENT DOCUMENTS

CN    101952688 A    1/2011
CN    102792314 A    11/2012
(Continued)

OTHER PUBLICATIONS

Decision to grant a European U.S. Appl. No. 17/902,686, dated Aug. 4, 2022.
(Continued)

*Primary Examiner* — Ig T An
*Assistant Examiner* — Mahmoud M Kazimi
(74) *Attorney, Agent, or Firm* — Maynard Nexsen PC; Ilya S. Mirov (57) ABSTRACT

A vehicular monitoring system (5) has a plurality of sensors (20, 30) that are used to sense the presence of objects (15) around a vehicle (10, 52) for detecting collision threats. At least one of the sensors is positioned such that a portion of the vehicle is at a predefined location relative to the sensor and is within the sensor's field of view. As an example, for an aircraft, a sensor may be positioned such that a portion of the aircraft's wing, aerospike, or other structure is within the sensor's field of view. The system is configured to automatically calibrate the sensor and, if desired, other sensors using the portion of the vehicle at the predefined location.

25 Claims, 7 Drawing Sheets

(51) Int. Cl.
*G01S 17/931* (2020.01)
*G01S 17/933* (2020.01)

(56) References Cited

U.S. PATENT DOCUMENTS

| | | |
|---|---|---|
| 2004/0054488 A1 | 3/2004 | Mai |
| 2004/0252862 A1 | 12/2004 | Camus et al. |
| 2005/0057647 A1 | 3/2005 | Nowak et al. |
| 2007/0182623 A1* | 8/2007 | Zeng ............... G01S 13/862 342/174 |
| 2009/0195371 A1 | 6/2009 | Camus |
| 2014/0032049 A1* | 1/2014 | Moshchuk ............ G08G 1/166 701/42 |
| 2014/0035737 A1* | 2/2014 | Rashid ................ B60Q 9/008 340/435 |
| 2014/0324336 A1* | 10/2014 | Prokhorov ............ G01C 21/20 701/445 |
| 2016/0343136 A1* | 11/2016 | Heidi .................... G06T 7/80 |
| 2018/0045536 A1* | 2/2018 | Kümmerle ............ G01C 25/00 |

FOREIGN PATENT DOCUMENTS

| | | | |
|---|---|---|---|
| DE | 102015205088 A1 | 9/2016 | |
| EP | 2767846 B1 | 8/2014 | |
| WO | 2016054004 A1 | 4/2016 | |
| WO | WO-2016054004 A1 * | 4/2016 | ........... B64C 39/024 |
| WO | 2018182722 A1 | 10/2018 | |

OTHER PUBLICATIONS

Supplementary European search report Written Opinion for European Application No. 17902686, dated Sep. 15, 2020.
First search (ORIGINAL), for Chinese Patent Application No. 201780089283, dated Sep. 9, 2022.
International Search Report and Written Opinion for International Application No. PCT/US2017/025592, dated Jun. 15, 2017.

* cited by examiner

SYSTEMS AND METHODS FOR CALIBRATING VEHICULAR SENSORS

BACKGROUND

Many vehicles have sensors for sensing external objects for various purposes. For example, drivers or pilots of vehicles, such as automobiles, boats, or aircraft, may encounter a wide variety of collision risks, such as debris, other vehicles, equipment, buildings, birds, terrain, and other objects. Collision with any such object may cause significant damage to a vehicle and, in some cases, injure its occupants. Sensors can be used to detect objects that pose a collision risk and warn a driver or pilot of the detected collision risks. If a vehicle is self-driven or self-piloted, sensor data indicative of objects around the vehicle may be used by a controller to avoid collision with the detected objects. In other examples, objects may be sensed and identified for assisting with navigation or control of the vehicle in other ways. As an example, a ground-based object, such as a building, a bridge, or markings on a runway or helipad, may be sensed and used as a navigational reference for navigating the vehicle to a destination or other desired location.

Often multiple sensors are used to sense objects in different regions around a vehicle, and data from the multiple sensors are fed into a controller that assesses the detected objects for collision avoidance, navigation, or other purposes. The sensor data from each sensor is usually relative to a predefined coordinate system, and it is important to ensure that each sensor is appropriately calibrated so that its data is accurately referenced to the coordinate system. In many cases, the sensors are calibrated manually, which can be time consuming and burdensome. In addition, after calibration, it is possible for the orientation or position of a sensor to change due to an inadvertent collision with a person or object, vibrations or other forces encountered by the vehicle, or for other reasons. In such cases, the data from a sensor may be erroneous until the sensor is re-calibrated.

In general, it would be desirable for the sensor calibration to be performed automatically so that it could be performed more frequently and with less burdens and cost. However, automatically calibrating sensors used on vehicles for detecting collision threats can be problematic. Specifically, the objects within a sensor's field of view may change or move at unpredictable speeds as the vehicle travels such that there is no suitable reference point that can be used for calibration during normal operation of the vehicle.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

DETAILED DESCRIPTION

The present disclosure generally pertains to systems and methods for calibrating sensors used on vehicles for sensing external objects. In some embodiments, a vehicular monitoring system has a plurality of sensors that are used to sense the presence of objects around a vehicle. At least one of the sensors is positioned such that a portion of the vehicle, referred to hereafter as a "reference feature," is at a predefined location relative to the sensor and is within the sensor's field of view. As an example, for an aircraft, a sensor may be positioned such that a portion (e.g., corner, surface, edge, tip, point of discontinuity, or other identifiable feature) of the aircraft's wing, aerospike, or other structure extending from the aircraft's fuselage is within the sensor's field of view. The system is configured to automatically calibrate the sensor and, if desired, other sensors using the reference feature.

In this regard, a data processing element may receive sensor data from a sensor indicative of objects that are within the sensor's field of view. Within the sensor data, the data processing element finds data representing the reference feature and uses such data to calibrate the sensor. As an example, using one or more points of the reference feature as a point or points of reference within the coordinate system, the data processing element may adjust the coordinates of the sensor data so that they are relative to a predefined coordinate system and accurately represent the location of objects within such coordinate system. In other embodiments, the sensor may be calibrated in other ways. As an example, rather than adjusting the coordinates of the sensor data, a sensor may be moved such that the reference feature is at predefined coordinates of the coordinate system. In yet other embodiments, other calibration techniques may be used.

After calibrating one sensor, other sensors may be calibrated using information from the calibrated sensor. As an example, the field of view of the calibrated sensor may overlap with the field of view of another sensor, referred to as an "uncalibrated sensor," such that an object (e.g., another vehicle) may be present in both fields of view. Since this object is at a known location within the coordinate system based on data from the calibrated sensor, such object can be used to calibrate the uncalibrated sensor in a similar manner relative to the calibration process described above. In this way, each sensor of the vehicular monitoring system can be automatically calibrated regardless of whether there is a reference feature at a predefined location within the sensor's field of view.

Figure 1:
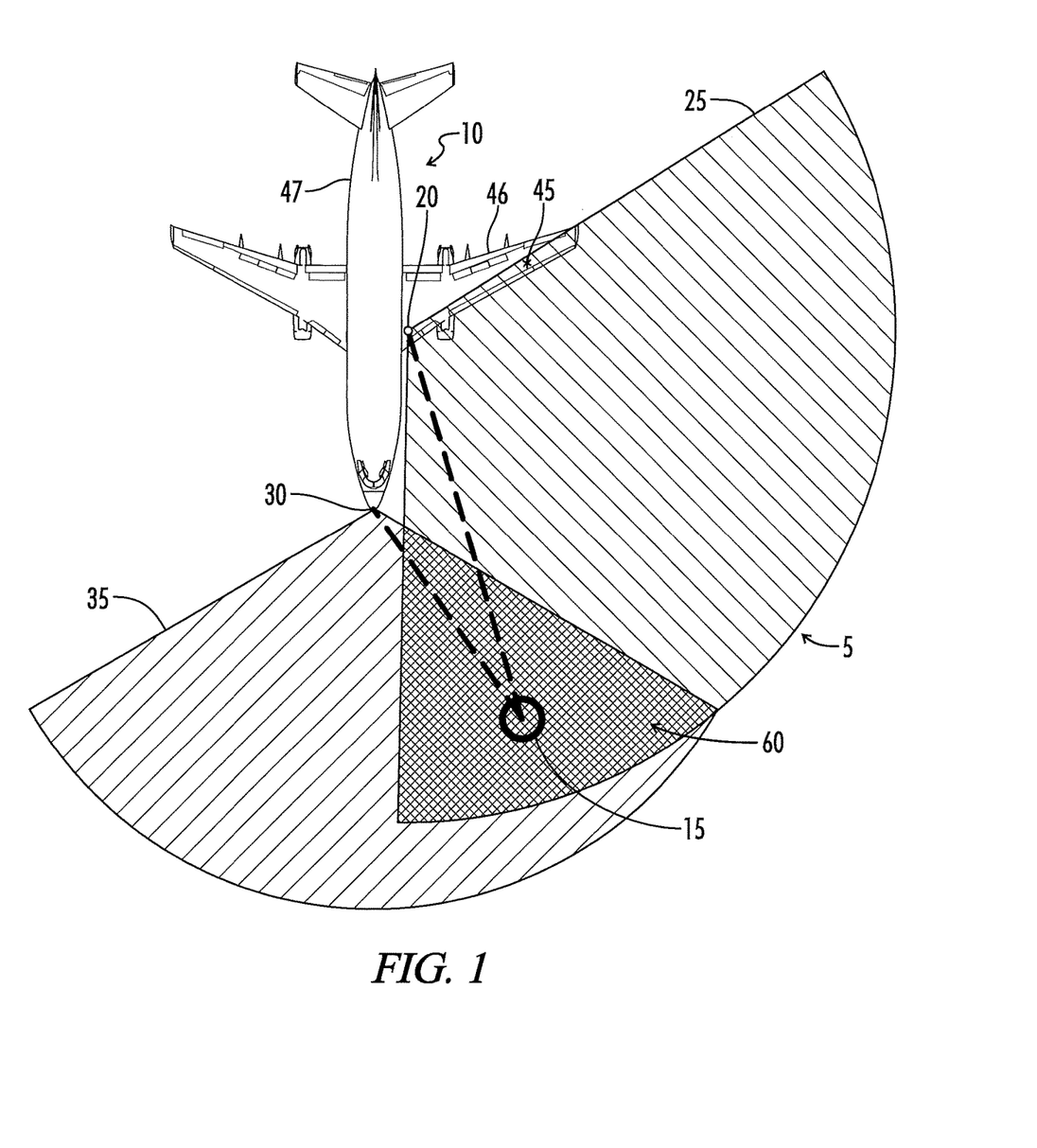
FIG. 1 depicts a top perspective view of a vehicle having a vehicular monitoring system in accordance with some embodiments of the present disclosure.

FIG. 1 depicts a top perspective view of a vehicle 10 having a vehicular monitoring system 5 that is used to sense objects external to the vehicle 10 in accordance with some embodiments of the present disclosure. The system 5 is configured to use one or more sensors 20, 30 to detect an object 15 that is within a certain vicinity of the vehicle 10, such as near a path of the vehicle 10. The system 5 may then make control decisions or provide warnings or other information, such as navigational information, based on the sensed objects.

As an example, the system 5 may determine that a sensed object 15 poses a threat to the vehicle 10, such as when the object 15 has a position or velocity that will place it near or within a path of the vehicle 10 as it travels. In such cases, the system 5 may provide a warning to a pilot or driver or autonomously take evasive action in an attempt to avoid the object 15. In another example, the system 5 may determine that the sensed object is a predefined navigational reference to be used for navigating the vehicle 10. In this regard, by controlling the vehicle 10 such that it moves to a predefined position relative to the sensed object, the vehicle 10 may be guided to a desired destination or other location. Such navigational control may occur at landing or takeoff for an aircraft where the object is at a predefined location relative to a runway, helipad, or other takeoff or landing site, but objects may be used for navigational control or other purposes at other times during a flight or other movement of the vehicle 10. Yet other uses of information indicative of sensed objects are possible in other examples.

In some embodiments, the vehicle 10 may be an aircraft, as depicted in FIG. 1, but other types of vehicles 10, such as automobiles or watercraft, may be used in other embodiments. The vehicle 10 may be manned or unmanned, and may be configured to operate under control from various sources. For example, the vehicle 10 may be an aircraft controlled by a human pilot, who may be positioned onboard the vehicle 10. In other embodiments, the vehicle 10 may be configured to operate under remote control, such by wireless (e.g., radio) communication with a remote pilot or driver. In some embodiments, the vehicle 10 may be self-piloted or self-driven. Various other types of techniques and systems may be used to control the operation of the vehicle 10.

The object 15 of FIG. 1 is depicted as a single object that has a specific size and shape, but it will be understood that object 15 may have various characteristics. In addition, although a single object 15 is depicted by FIG. 1, there may be any number of objects 15 within a vicinity of the vehicle 10 in other embodiments. The object 15 may be stationary, as when the object 15 is a building, but in some embodiments, the object 15 may be capable of motion. For example, the object 15 may be another vehicle in motion along a path that may pose a risk of collision with the vehicle 10. The object 15 may be other obstacles (e.g., terrain or buildings) posing a risk to safe operation of vehicle 10 in other embodiments.

FIG. 1 also depicts a sensor 20 having a field of view 25 in which the sensor 20 may detect the presence of objects. The sensor 20 may be of various types for monitoring space around vehicle 10. In some embodiments, the sensor 20 may sense the presence of an object 15 within the field of view and provide sensor data indicative of a location of the object 15. Such sensor data may then be processed to determine whether the object 15 presents a collision threat to the vehicle 10, as will be described in more detail below.

In some embodiments, the sensor 20 may be a camera, such as a conventional camera for capturing images of a scene and providing image data defining the captured scene. Such image data may define a plurality of pixels where each pixel represents a portion of the captured scene and includes a color value and a set of coordinates indicative of the pixel's location within the image. In other embodiments, other types of sensors are possible. As an example, the sensor 20 may comprise any optical or non-optical sensor for detecting the presence of objects, such as an electro-optical or infrared (EO/IR) sensor, a light detection and ranging (LIDAR) sensor, a radio detection and ranging (radar) sensor, or other sensor type. Note that the term "field of view," as used herein, does not imply that a sensor is optical but rather generally refers to the region in which a sensor is capable of sensing objects regardless of the type of sensor that is employed.

The sensor 20 may have a field of view 25 defining a space in which the sensor 20 may sense objects 15. The field of view 25 may cover various regions, including two-dimensional and three-dimensional spaces, and may have various shapes or profiles. In some embodiments, the field of view 25 may be a three-dimensional space having dimensions that depend on the characteristics of the sensor 20. Note, however, that in the embodiment of FIG. 1, it is possible that the field of view 25 may not have a shape or profile allowing the sensor 20 to monitor all space surrounding vehicle 10. In this regard, additional sensors may be used to expand the area in which the system 5 can detect objects. As an example, FIG. 1 shows a sensor 30 having a field of view 35 that is different than the field of view 25 of sensor 20. If desired, the sensor 30 may be of the same type or configured similar to the sensor 20 in order to detect objects 15 within its field of view 35, but it is also possible for the sensor 30 to be of a different type than sensor 20. For illustrative purposes, unless otherwise indicated, it will be assumed hereafter that each sensor 20, 30 is implemented as a camera that captures images of scenes within its respective field of view, but it should be emphasized that other types of sensors 20, 30 may be used as may be desired.

In some embodiments, the field of view 25 of sensor 20 may overlap with the field of view 35 of sensor 30, as shown by FIG. 1. Such an overlap helps to ensure complete coverage around the vehicle 10 with no gaps in coverage. Although FIG. 1 shows only two sensors 20, 30 for illustrative purposes, it is to be understood that any number of sensors 20, 30 can be used. As an example, several sensors may be positioned around the vehicle 10 so that an object 15 can be detected as it approaches the vehicle regardless of the direction from which it approaches.

Figure 2:
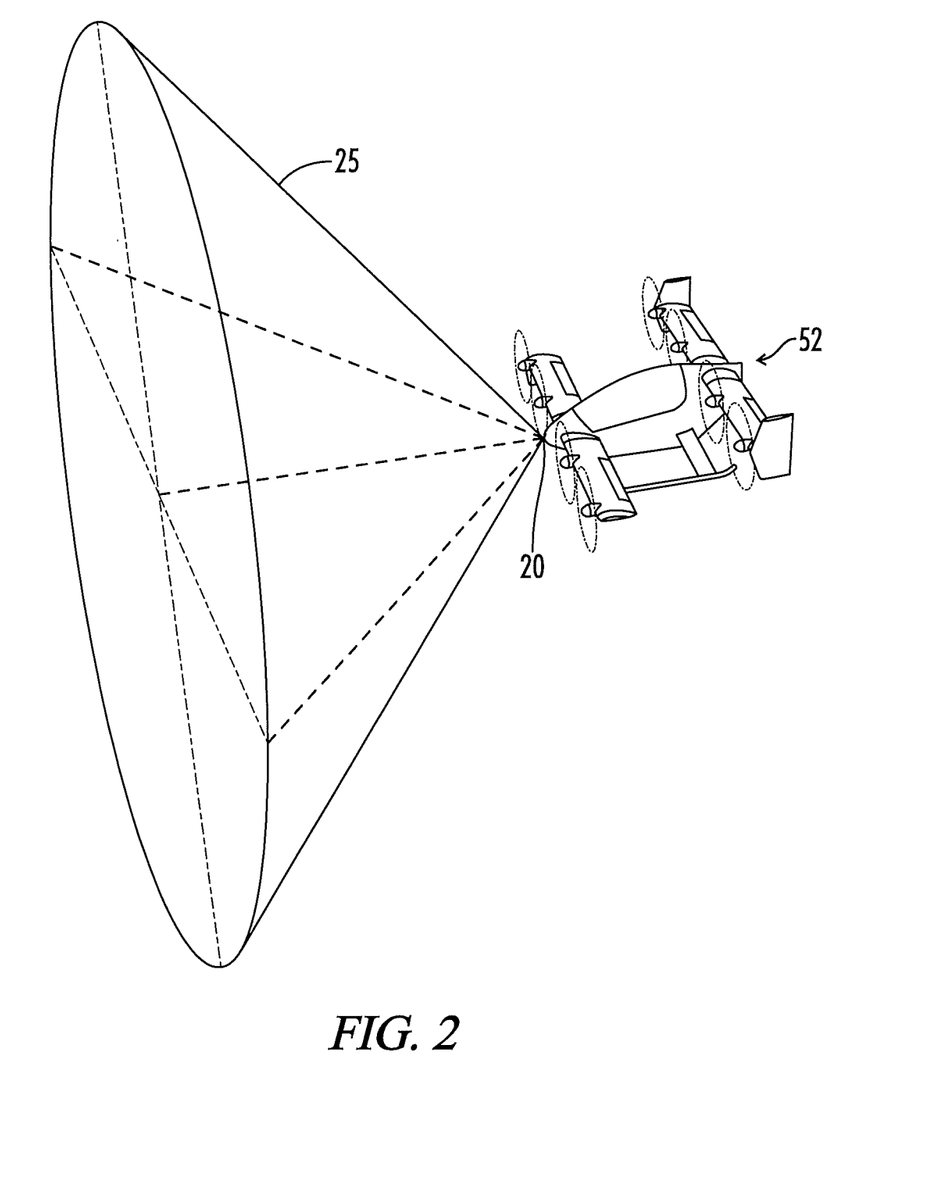
FIG. 2 depicts a perspective view of a vehicle having a vehicular monitoring system in accordance with some embodiments of the present disclosure.
Figure 3:
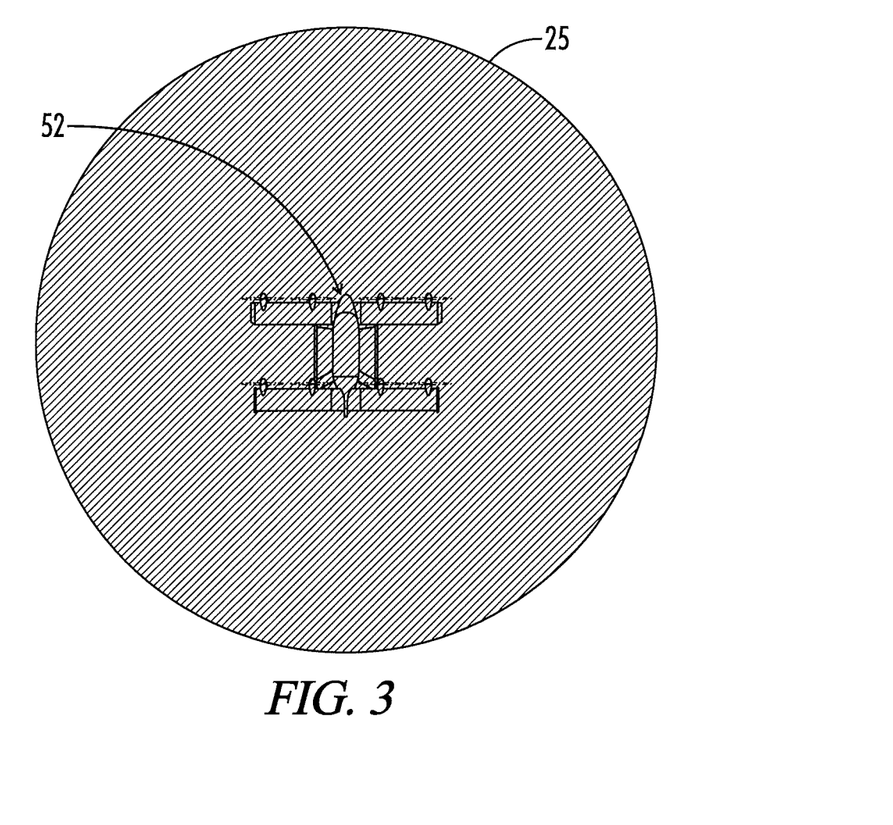
FIG. 3 depicts a top perspective view of the vehicle depicted by FIG. 2.

In this regard FIG. 2 depicts an exemplary VTOL aircraft 52 having a sensor 20 for sensing objects within its field of view 25. Exemplary embodiments of VTOL aircraft are described in PCT Application No. PCT/US17/18182, entitled "Self-Piloted Aircraft for Passenger or Cargo Transportation" and filed on Feb. 16, 2017, which is incorporated herein by reference. As shown by FIG. 2, the field of view 25 is three-dimensional. Additional sensors (not shown in FIG. 2) may be at other locations on the aircraft 52 such that the fields of view of all of the sensors completely encircle the aircraft 52 in all directions, as shown by FIG. 3. Note that such fields of view, when aggregated together, may form a sphere (or other shape) of airspace completely surrounding the aircraft 52 such that an object 15 approaching the aircraft 52 within a certain range should be within the field of view of at least one sensor 20 and, therefore, sensed by at least one sensor 20 regardless of its direction from the aircraft 52. In some embodiments, a single sensor 20 having a field of view 25 similar to the one shown by FIG. 3 may be used thereby obviating the need to have multiple sensors to observe the airspace completely surrounding the aircraft 52.

In the embodiment of FIG. 1, the field of view 25 for sensor 20 includes a portion of the vehicle 10, referred to herein as a "reference feature," that can be used as a reference for calibrating the sensor 20. The reference feature 45 may be any portion of the vehicle 10 that is at a predefined location relative to a coordinate system for the vehicle 10. That is, the location of at least one point of the reference feature 45 within the coordinate system is known. As an example, the location of one or more points of the reference feature 45 may be defined with coordinates that are stored in memory (not shown in FIG. 1) and then used to calibrate the sensors 20, 30, as will be described in more detail below. Note that the coordinates may be of any type, such as Cartesian or polar, and the coordinate system may be relative to the vehicle 10. As an example, the origin of the coordinate system may be at a fixed point relative to the vehicle 10 such that the vehicle is stationary within the coordinate system.

In the embodiment depicted by FIG. 1, the reference feature 45 is a portion of a wing 46 that extends from a fuselage 47 of the vehicle 10. In other embodiments, other portions of the vehicle 10 (e.g., an engine, an aerospike, a portion of the fuselage 47, a horizontal or vertical stabilizer, etc.) may be used for the reference feature. In some embodiments, the reference feature 45 is stationary relative to the vehicle 10 so that it remains at a fixed location within the coordinate system. However, it is unnecessary for a reference feature 45 to be stationary. In this regard, an object may be used as a reference feature 45 so long as its location within the coordinate system is known regardless of whether it moves relative to the vehicle 10.

It should be noted that aircraft are particularly suited for calibration according to the techniques described herein as they typically have objects, such as wings, stabilizers, aerospikes, and other structures that extend out from the aircraft's main body (e.g., fuselage) a significant distance. However, the calibration techniques described herein are not limited to aircraft and may be used for calibrating other vehicles, such as automobiles and boats.

An example configuration of a system 5 for sensing objects 15 external to a vehicle 10 is described below. In this regard, each sensor 20, 30 of the vehicle 10 may be configured to collect sensor data indicative of objects within each sensor's respective field of view 25, 35. In some embodiments, the sensor data may include measurement values correlated with coordinate values that are relative to a local coordinate system used by the respective sensor 20, 30. The coordinates of the sensor 20, 30 may be converted from the sensor's local coordinate system to a global coordinate system that is used for assessing collision threats. In this regard, sensor data from multiple sensors 20, 30 may be converted to a global coordinate system for the vehicle 10 so that the location of an object detected by one sensor can be easily compared to the location of an object detected by another sensor within the same global coordinate system.

In some embodiments, the system 5 may store data, referred to herein as "calibration data," indicating a predefined location of the reference feature 45 relative to the global coordinate system for the vehicle 10. The calibration data also indicates an expected shape or contour of the reference feature from the perspective of the sensor so that the reference feature can be identified in the sensor data provided by the sensor 20.

In this regard, when the sensor 20 provides a sample of sensor data (e.g., an image captured by the sensor 20), the system 5 may analyze the sample using the calibration data in order to find the reference feature 45 within the sample. For example, when the sensor data defines an image, the system 5 may search the sensor data for an object having a shape that corresponds to the expected shape of the reference feature 45. If the system 5 identifies the reference feature 45 within the sensor data, the system 5 may compare one or more of the coordinates of the reference feature 45 (relative to the sensor's local coordinate system) to one or more known coordinates of the reference feature 45 (relative to the global coordinate system), as indicated by the calibration data. Based on this comparison, the system 5 can determine how to calibrate the data from the sensor 20 in order to account for the sensor's position and orientation relative to the reference feature 45 and, hence, vehicle 10.

As an example, based on differences in the coordinates of the reference feature 45 in the sensor data and the expected coordinates of the reference feature 45 in the calibration data, the system 5 may determine a mathematical relationship that can be used to convert local coordinates from the sensor 20 into global coordinates relative to the global coordinate system. Specifically, the relationship may be defined such that the converted global coordinates of the reference feature 45 in the sensor data from the sensor 20 match corresponding global coordinates of the reference feature 45 in the calibration data. Notably, such conversion takes into account the actual position and orientation of the sensor 20 relative to the reference feature 45 so that the converted coordinates of an object accurately represent the object's location within the global coordinate system. Once a suitable relationship between the local coordinates and global coordinates is determined, the relationship may be used to convert local coordinates received from the sensor 20 into global coordinates, thereby calibrating the sensor 20 to the global coordinate system.

Note that other sensors of the vehicle 10 used for object detection may be calibrated in a similar manner assuming that there is a reference feature of the vehicle 10 within the sensor's field of view. However, it is possible that a particular sensor may not have a reference feature for calibration. In such case, it is possible to calibrate the sensor using information from another calibrated sensor. Indeed, as long as one sensor is calibrated, it is possible to calibrate any of the other sensors using information from the calibrated sensor.

As an example, in FIG. 1, assume that the sensor 30 has no reference feature of the vehicle 10 within its field of view 35. However, as described above, the field of view 35 of the sensor 30 overlaps with the field of view 25 of the sensor 20 in a region 60, referred to hereafter as "overlapping region." When an object 15, such as another vehicle, comes within the overlapping region 60, it is possible to use the object 15 to calibrate the sensor 30 even though the object 15 may be located at any point in the overlapping region 60. In this regard, while in the overlapping region 60, the system 5 can determine the precise location of the object 15 within the global coordinate system using information from sensor 20, which has been calibrated according to the techniques described above. Thus, the measured location of the object 15 from the calibrated sensor 20 can be used as a point of reference to calibrate the sensor 30, according to techniques described above for using the predefined location of the reference feature 45 from the calibration data as a point of reference to calibrate the sensor 20.

More specifically, the system 5 may be configured to analyze a sample from the sensor 20 taken at approximately the same time as a sample from the sensor 30 such that the object 15 should be at approximately the same location in both samples. After detecting the object 15 and determining the global coordinates of the object 15 in the sample from the sensor 20, the system 5 may analyze the sample from the sensor 30 in order to find the object 15 within such sample. For example, when the sensor data from the sensor 30 defines an image, the system 5 may search the sensor data for an object having a shape that corresponds to the object 15 detected in the sample from the sensor 20. If the system 5 identifies the object 15 within the sample from the sensor 30, the system 5 may compare one or more of the coordinates of the object 15 (relative to the local coordinate system of the sensor 30) to one or more known coordinates of the object (relative to the global coordinate system), as determined from the sample provided by the calibrated sensor 20. Based on this comparison, the system 5 can determine how to calibrate the sensor 30 in order to account for the sensor's position and orientation relative to the vehicle 10.

As an example, based on differences in the local coordinates of the object 15 in the sample from the sensor 30 and the global coordinates of the object 15 in the sample from the calibrated sensor 20, the system 5 may determine a mathematical relationship that can be used to convert local coordinates from the sensor 30 into global coordinates relative to the global coordinate system. Specifically, the relationship may be defined such that the converted global coordinates of the object 15 in the sample from the sensor 30 match corresponding global coordinates of the object 15 in the sample from the calibrated sensor 20. Notably, such conversion takes into account the actual position and orientation of the sensor 30 relative to the vehicle 10 so that the converted coordinates of an object 15 accurately represent the object's location within the global coordinate system. Once a suitable relationship between the local coordinates and global coordinates is determined for the sensor 30, the relationship may be used to convert local coordinates received from the sensor 30 into global coordinates, thereby calibrating the sensor 30 to the global coordinate system. Once the sensor 30 is calibrated, other sensors (not specifically shown) may be calibrated using information from the sensor 30 in the same way as described above for using information from the sensor 20 to calibrate the sensor 30.

In other embodiments, other techniques for calibrating the sensors 20, 30 are possible. As an example, the sensor 20 may be configured to move under the control of the system 5. In this regard, the sensor 20 may have a motor (not specifically shown) and/or other components for moving the sensor relative to the vehicle 10 based on a control signal from the system 5. When the sensor 20 provides a sample of sensor data, the system 5 may analyze the sample using calibration data to find the reference feature 45 within the sample as described above. The calibration data may indicate the desired coordinates of the reference feature 45. If the sensor 20 has moved such that the reference feature 45 is not at a location corresponding to the desired coordinates in the sample, then the system 5 is configured to move the sensor 20 until the reference feature 45 appears at a location corresponding to the desired coordinates indicated by the calibration data. Thus, if the sensor 20 is properly oriented with respect to the reference feature 45 such that the reference feature 45 appears at a location corresponding to the desired coordinates indicated by the calibration data and if the sensor 20 is inadvertently moved such that the reference feature 45 appears at different coordinates within the sensor data, the system 5 may move the sensor 20 such it is again properly oriented with respect to the reference feature 45, thereby calibrating the sensor 20 to the reference feature 45. In yet other embodiments, other techniques for calibrating the sensor 20 possible.

Note that the difference in the coordinates of the reference feature 45 in the sample from the sensor 20 and the coordinates of the reference feature 45 in the calibration data may indicate an anomaly for which a warning is desirable. For example, small differences may result from normal operation and vibrations of the vehicle 10. However, if the difference is sufficiently great, it may indicate an anomaly, such as a collision with a foreign object that damaged the vehicle 10 or a fatigue failure that caused the sensor 20 to move significantly. In some embodiments, the system 5 compares the difference to a predefined threshold and provides a warning notification (such as a warning message, an audio or visual alarm, or other type of warning) to notify a user (e.g., a driver or pilot of the vehicle 10) if the difference exceeds the threshold. The warning notification may be displayed or otherwise rendered to the user by a display device or other types of output interfaces, such as a speaker or a light indicator. In response to the warning notification, the user may inspect the area of the sensor 20 to determine if any further action should be taken, such as a repair of the vehicle 10.

Figure 4:
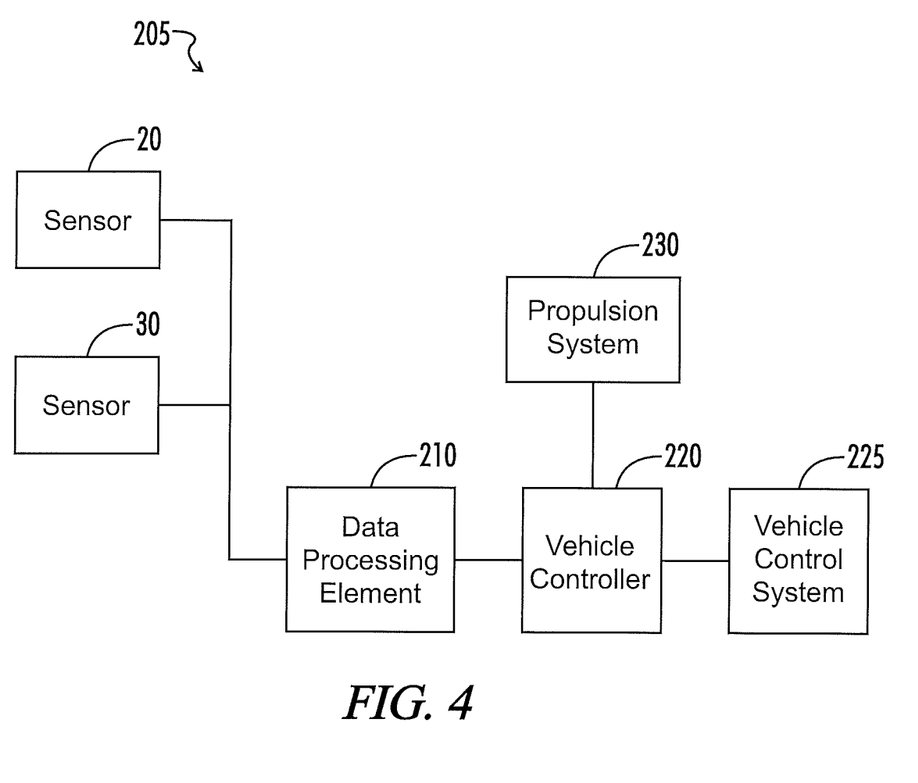
FIG. 4 is a block diagram illustrating various components of a vehicular monitoring system in accordance with some embodiments of the present disclosure.

FIG. 4 depicts an exemplary embodiment of a vehicular monitoring system 205 in accordance with some embodiments of the present disclosure. In some embodiments, the vehicular monitoring system 205 is configured for monitoring and controlling operation of an aircraft, but the system 205 may be configured for other types of vehicles in other embodiments. The vehicular monitoring system 205 of FIG. 4 may include a data processing element 210, a plurality of sensors 20, 30, a vehicle controller 220, a vehicle control system 225 and a propulsion system 230. Although particular functionality may be ascribed to various components of the vehicular monitoring system 205, it will be understood that such functionality may be performed by one or more components the system 205 in some embodiments. In addition, in some embodiments, components of the system 205 may reside on the vehicle 10 or otherwise, and may communicate with other components of the system 205 via various techniques, including wired (e.g., conductive) or wireless communication (e.g., using a wireless network or short-range wireless protocol, such as Bluetooth). Further, the system 205 may comprise various components not depicted in FIG. 4 for achieving the functionality described herein and generally performing threat-sensing operations and vehicle control.

In some embodiments, as shown by FIG. 4, the data processing element 210 may be coupled to each sensor 20, 30, process the sensor data, from the sensors 20, 30, and provide signals to the vehicle controller 220 for controlling the vehicle 10. The data processing element 210 may be various types of devices capable of receiving and processing sensor data from sensors 20, 30, and may be implemented in hardware or a combination of hardware and software. An exemplary configuration of the data processing element 210 will be described in more detail below with reference to FIG. 5.

The vehicle controller 220 may include various components for controlling operation of the vehicle 10, and may be implemented in hardware or a combination of hardware and software. As an example, the vehicle controller 220 may comprise one or more processors (not specifically shown) programmed with instructions for performing the functions described herein for the vehicle controller 220. In some embodiments, the vehicle controller 220 may be communicatively coupled to other components of system 205, including data processing element 210 (as described above, for example), vehicle control system 225, and propulsion system 230.

Vehicle control system 225 may include various components for controlling the vehicle 10 as it travels. As an example, for an aircraft, the vehicle control system 225 may include flight control surfaces, such as one or more rudders, ailerons, elevators, flaps, spoilers, brakes, or other types of aerodynamic devices typically used to control an aircraft. Further, the propulsion system 230 may comprise various components, such as engines and propellers, for providing propulsion or thrust to a vehicle 10. As will be described in more detail hereafter, when the data processing element 210 senses an object, the vehicle controller 220 may be configured to take an action in response to the object, such as a provide a warning or other information to a user (e.g., a pilot or driver) or control the vehicle control system 225 and the propulsion system 230 to change the velocity (speed and/or direction) of the vehicle 10. As an example, the vehicle controller 200 may control the velocity of the vehicle in an effort to avoid the sensed object or to navigate to a desired destination or other location based on the sensed object.

Figure 5:
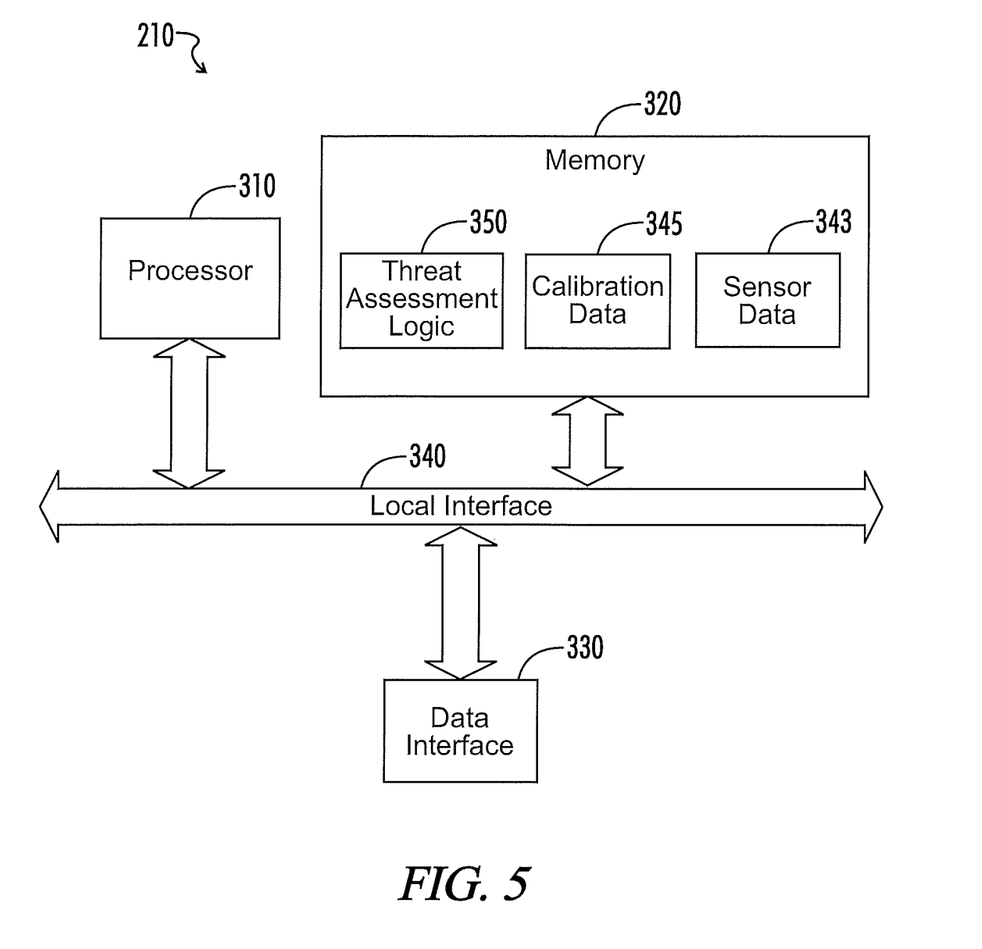
FIG. 5 is a block diagram illustrating a data processing element for processing sensor data in accordance with some embodiments of the present disclosure.

FIG. 5 depicts an exemplary data processing element 210 in accordance with some embodiments of the present disclosure. In some embodiments, the data processing element 210 may include one or more processors 310, memory 320, a data interface 330 and a local interface 340. The processor 310, e.g., a central processing unit (CPU) or a digital signal processor (DSP), may be configured to execute instructions stored in memory in order to perform various functions, such as processing of sensor data from the sensors 20, 30 (FIG. 2). The processor 310 may communicate to and drive the other elements within the data processing element 305 via the local interface 340, which can include at least one bus. Further, the data interface 330 (e.g., ports or pins) may interface components of the data processing element 210 with other components of the system 5, such as the sensors 20, 30 and the vehicle controller 220.

As shown by FIG. 5, the data processing element 210 may comprise sensor processing logic 350, which may be implemented in hardware, software or any combination thereof. In FIG. 5, the sensor processing logic 350 is implemented in software and stored in memory 320. However, other configurations of the sensor processing logic 350 are possible in other embodiments.

Note that the sensor processing logic 350, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The sensor processing logic 350 is configured to calibrate the sensors 20, 30 and to process the sensor data 343 from the sensors 20, 30 according to the techniques described herein. In some embodiments, the sensor processing logic 350 may be configured to identify objects 15 sensed by the sensors 20, 30 and to assess whether each sensed object 15 poses a collision threat to the vehicle 10 based on the object's location and velocity relative to the vehicle 10 and the vehicle's velocity or expected path of travel. Once the sensor processing logic 350 determines that an object 15 is a collision threat, the sensor processing logic 350 may inform the vehicle controller 220 of the threat, and the vehicle controller 220 may take additional action in response to the threat. As an example, the vehicle controller 220 may provide a warning to a user or control the vehicle's travel path to avoid the sensed object 15. Exemplary warnings may include messages, such as human-readable textual messages delivered to the vehicle's operator. Other exemplary warnings may include audible warnings (e.g., sirens), visible warnings (e.g., lights), physical warnings (e.g., haptics) or otherwise. The sensor processing logic 350 may also provide a warning if the comparison of sensor data to calibration indicates an anomaly, such as a collision or fatigue failure, as described above.

In some embodiments, the sensor processing logic 350 may determine whether a sensed object is of a type that may be used for navigation or other vehicle control operations. If so, the sensor processing logic 350 may inform the vehicle controller 220 of the object and its location, and the vehicle controller 220 may make control decision based on the sensed object.

An exemplary use and operation of the system 5 in order to calibrate the sensors 20, 30 will be described in more detail below with reference to FIGS. 6 and 7. For illustrative purposes, it will be assumed that the reference feature 45 is within the field of view 25 of sensor 20 and that the data processing element 210 stores predefined calibration data 345, as shown by FIG. 5, indicative of the shape and location of the reference feature 45 relative to a global coordinate system used for tracking collision threats for the vehicle 10.

Initially, the sensor processing logic 350 is configured to calibrate the sensor 20 having a field of view 25 in which the reference feature 45 is located. In this regard, the sensor 20 takes a sample of sensor data 343 and sends the sample to the sensor processing logic 350, as shown by block 411 of FIG. 6. If the sensor 20 is implemented as a camera, the sensor 20 may capture an image within its field of view 25 and send the captured image to the sensor processing logic 350 for analysis.

Figure 6:
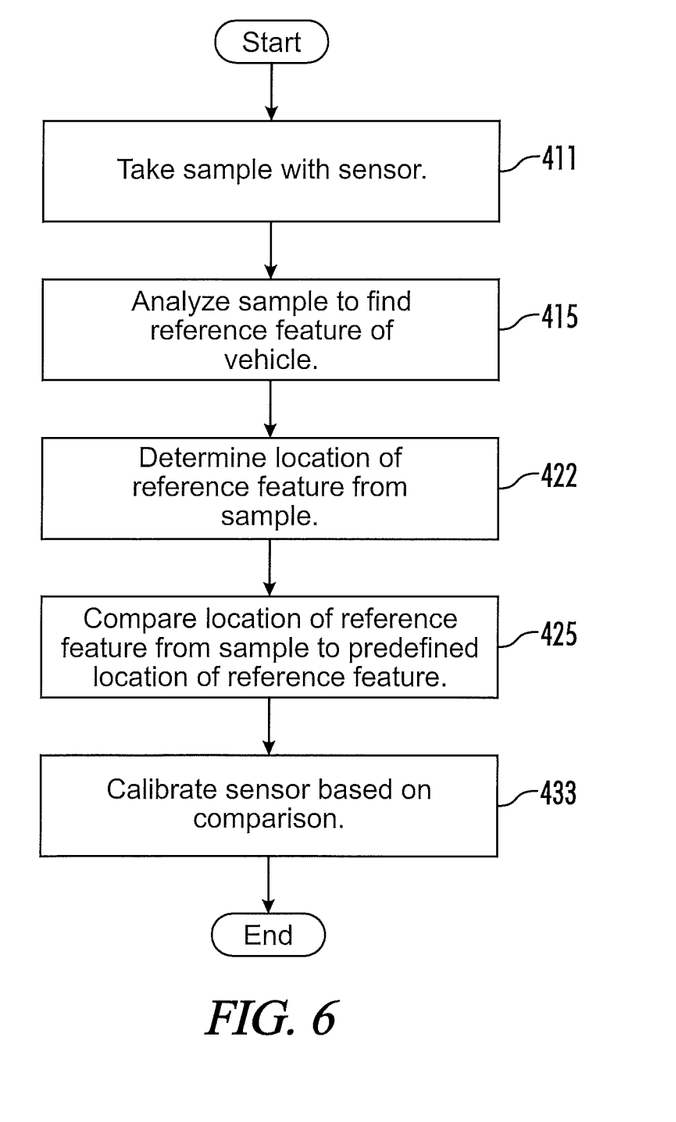
FIG. 6 is a flow chart illustrating a method for calibrating vehicular sensors in accordance with some embodiments of the present disclosure.

The sensor processing logic 350 is configured to analyze the sample to find the reference feature 45 in the sample, as shown by block 415 of FIG. 6. As an example, if the sensor 20 is a camera, the sensor processing logic 350 may compare the shape of the reference feature 45 indicated by the calibration data 345 to the shapes of objects in the sample in order to find an object having a corresponding shape. Once the reference feature 45 is identified in the sample, the sensor processing logic 350 is configured to determine the location of the reference feature 45 from the sample, as shown by block 422 of FIG. 6. After determining such location, the sensor processing logic 350 compares the location of the reference feature 45 indicated by the sample from sensor 20 to the location of the reference feature indicated by the calibration data 345, as shown by block 425, and the sensor processing logic 350 calibrates the sensor 20 based on such comparison, as shown by block 433 of FIG. 6.

As an example, based on the difference in the compared locations, the sensor processing logic 350 determines a mathematical adjustment to be applied to the coordinates of sensor data from the sensor 20 in order accurately convert such coordinates into global coordinates that are relative to the global coordinate system used for tracking objects. Thereafter, the mathematical adjustment is applied to the coordinates of the sensor data 343 from the sensor 20 by the sensor processing logic 350 or otherwise so that the coordinates of sensed objects accurately indicate the objects' locations within the global coordinate system.

In another example, the sensor processing logic 350 may be configured to provide a control signal to the sensor 20 based on the difference in the compared locations in block 425. Such control signal may be sufficient for causing the sensor 20 to move to a new orientation such that the reference feature 45 is at the location for the reference feature indicated by the calibration data 345.

Figure 7:
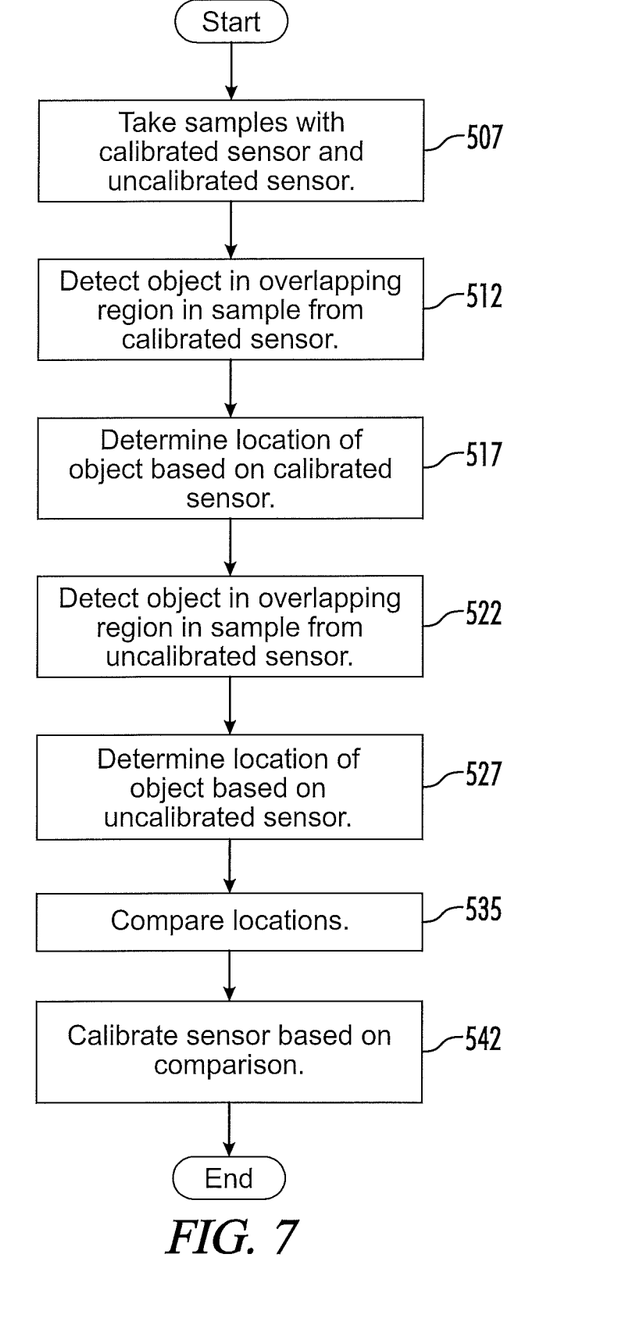
FIG. 7 is a flow chart illustrating a method for calibrating vehicular sensors in accordance with some embodiments of the present disclosure.

Once the sensor 20 is calibrated, an uncalibrated sensor 30 having a field of view 35 overlapping with the field of view 25 of the calibrated sensor 20 may be calibrated according to the method of FIG. 7. In this regard, a sample is simultaneously taken from each sensor 20, 30 while an object 15 is in an overlapping region 60, as shown by block 507 of FIG. 7. Such samples are provided to the sensor processing logic 350, which detects the object 15 in the sample from the calibrated sensor 20, as shown by block 512 of FIG. 7. The sensor processing logic 350 then determines the location of the object 15 from the sample provided by the calibrated sensor 20, as shown by block 517 of FIG. 7. Since the sensor 20 has been calibrated, the determined location should accurately reflect the object's location within the global coordinate system for the vehicle 10.

As shown by block 522, the sensor processing logic 350 also detects the same object 15 in the sample from the uncalibrated sensor 30. The sensor processing logic 350 then determines the location of the object 15 from the sample provided by the uncalibrated sensor 30, as shown by block 527 of FIG. 7. After determining such location, the sensor processing logic 350 compares the location of the object 15 indicated by the sample from the uncalibrated sensor 30 to the location of the object 15 indicated by the sample from the calibrated sensor 20, as shown by block 535, and the sensor processing logic 350 calibrates the sensor 30 based on such comparison, as shown by block 542 of FIG. 7.

As an example, based on the difference in the compared locations, the sensor processing logic 350 determines a mathematical adjustment to be applied to the coordinates of sensor data 343 from the sensor 30 in order accurately convert such coordinates into global coordinates that are relative to the global coordinate system used for tracking objects. Thereafter, the mathematical adjustment is applied to the coordinates of the sensor data 343 from the sensor 30 by the sensor processing logic 350 or otherwise so that the coordinates of sensed objects accurately indicate their locations within the global coordinate system.

In another example, the sensor processing logic 350 may be configured to provide a control signal to the sensor 20 based on the difference in the compared locations in block 535. Such control signal may be sufficient for causing the sensor 20 to move to a new orientation such that the same object detected by both sensors 20, 30 is at the same coordinates for both sensors 20, 30.

Various embodiments are described above as using a camera to implement the sensors 20, 30. However, it should be emphasized that other types of sensors 20, 30 may be used and calibrated according to the same or similar techniques described herein.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system, comprising:
   a first sensor configured to sense objects external to a vehicle within a first field of view, the first sensor positioned on the vehicle such that a feature of the vehicle is within the first field of view, the first sensor configured to provide first sensor data indicative of the sensed objects within the first field of view, wherein the first sensor data from the first sensor includes a first sample indicative of a first object within a region of the first field of view;
   a second sensor positioned on the vehicle and configured to sense objects within a second field of view overlapping with the first field of view, the second sensor configured to provide second sensor data indicative of the sensed objects within the second field of view, wherein the second sensor data includes a second sample indicative of the first object within the region;
   memory for storing calibration data indicative of a location of the feature within a global coordinate system for the vehicle; and
   at least one processor configured to receive the first sensor data and the second sensor data and to detect objects external to the vehicle based on the first sensor data and the second sensor data, the at least one processor configured to perform a first comparison between a location of the feature indicated by the first sensor data and the location of the feature indicated by the calibration data, the at least one processor further configured to calibrate the first sensor based on the first comparison and to determine a location of the first object within the global coordinate system based on the first sample after the first sensor has been calibrated using the first comparison, the at least one processor configured to determine a location of the first object within a local coordinate system for the second sensor based on the second sample, the at least one processor configured to receive the second sensor data and to perform a second comparison between the location of the first object within the global coordinate system determined from the first sample and the location of the first object within the local coordinate system for the second sensor indicated by the second sample, wherein the at least one processor is configured to calibrate the second sensor based on the second comparison.

2. The system of claim 1, wherein the first sensor is an optical sensor.

3. The system of claim 1, wherein the vehicle is an aircraft.

4. The system of claim 1, wherein the vehicle is an automobile.

5. The system of claim 1, wherein the at least one processor is configured to calibrate the first sensor based on the first comparison by providing a control signal for moving the first sensor.

6. The system of claim 1, further comprising a vehicle controller configured to control a velocity of the vehicle based on the detected objects.

7. The system of claim 1, wherein the vehicle controller is configured to identify at least one of the detected objects as a navigational reference for navigating the vehicle.

8. The system of claim 1, wherein the at least one processor is configured to detect a second object within the first field of view based on the first sensor data, and wherein the at least one processor is configured to determine whether the second object is a collision threat for the vehicle.

9. The system of claim 8, further comprising a vehicle controller configured to provide a warning in response to a determination that the second object is a collision threat for the vehicle.

10. The system of claim 8, further comprising a vehicle controller configured to adjust a path of the vehicle to avoid the second object in response to a determination that the second object is a collision threat for the vehicle.

11. The system of claim 1, wherein the object is a vehicle.

12. The system of claim 1, wherein the at least one processor is configured to determine, based on the second comparison, a mathematical relationship for converting local coordinates relative to the local coordinate system for the second sensor into global coordinates relative to the global coordinate system, and wherein calibration of the second sensor by the at least one processor is based on the determined mathematical relationship.

13. A system, comprising:
   a first sensor positioned on a vehicle for sensing positions of objects within a first field of view of the first sensor, the first sensor configured to provide first sensor data having measurement values correlated with coordinate values, wherein the first sensor is positioned such that a feature of the vehicle is within the first field of view of the first sensor;
   a second sensor positioned on the vehicle for sensing positions of objects within a second field of view of the second sensor, the second sensor configured to provide second sensor data having measurement values correlated with coordinate values, wherein the second field of view of the second sensor overlaps with the first field of view of the first sensor in an overlapping region in which a first object is located;
   memory for storing calibration data indicative of a location of the feature relative to a global coordinate system for the vehicle; and
   at least one processor configured to receive the first sensor data, the at least one processor configured to detect a presence of a second object within the first field of view based on the first sensor data and to provide positional information indicative of a location of the second object relative to the global coordinate system, the at least one processor configured to identify the feature of the vehicle within the first sensor data and to perform a first comparison between a location of the feature indicated by the first sensor data and the location of the feature indicated by the calibration data, the at least one processor further configured to calibrate the first sensor based on the first comparison, the at least one processor configured to receive the second sensor data, detect a presence of the first object within the second field of view based on the second sensor data, and determine a location of the first object within a local coordinate system for the second sensor based on the second sensor data, the at least one processor configured to detect a presence of the first object within the first field of view based on the first sensor data and determine a location of the first object within the global coordinate system based on the first sensor data, the at least one processor further configured to perform a second comparison between the location of the first object within the global coordinate system indicated by the first sensor data and the location of the first object within the local coordinate system indicated by the second sensor data, the at least one processor further configured to calibrate the second sensor based on the second comparison.

14. The system of claim 13, wherein the at least one processor is configured to calibrate the first sensor based on the first comparison by providing a control signal for moving the first sensor.

15. The system of claim 13, further comprising a vehicle controller configured to control a velocity of the vehicle based on the objects within the first field of view of the first sensor.

16. The system of claim 13, wherein the at least one processor is configured to determine whether the second object is a collision threat to the vehicle based on the location of the second object indicated by the first sensor data from the first sensor.

17. The system of claim 13, wherein the vehicle controller is configured to identify at least one of the objects as a navigational reference for navigating the vehicle.

18. A method for monitoring collision threats for a vehicle, comprising:
   sensing with a first sensor objects that are within a first field of view of the first sensor, the first sensor positioned such that a feature of the vehicle is within the first field of view;
   storing in memory calibration data indicative of a location of the feature within a global coordinate system for the vehicle;
   receiving first sensor data from the first sensor;
   detecting objects external to the vehicle based on the first sensor data from the first sensor;
   comparing a location of the feature indicated by the first sensor data from the first sensor and a location of the feature indicated by the calibration data;
   calibrating the first sensor based on the comparing the location of the feature indicated by the first sensor data;
   sensing with a second sensor objects that are within a second field of view of the second sensor, the second sensor positioned such that the second field of view overlaps with the first field of view;
   receiving second sensor data from the second sensor;
   detecting a first object within a region where the second field of view overlaps with the first field of view;
   determining a location of the first object within the global coordinate system based on the first sensor data from the first sensor after the calibrating the first sensor;
   determining a location of the first object within a local coordinate system for the second sensor based on the second sensor data from the second sensor;
   comparing the location of the first object within the global coordinate system to the location of the first object within local coordinate system; and
   calibrating the second sensor based on the comparing the location of the first object within the global coordinate system to the location of the first object within the local coordinate system.

19. The method of claim 18, wherein the first sensor is an optical sensor.

20. The method of claim 18, wherein the calibrating the first sensor comprises moving the first sensor.

21. The method of claim 18, further comprising controlling a velocity of the vehicle based on the detecting the objects external to the vehicle.

22. The method of claim 18, further comprising:
   identifying at least one of the objects as a navigational reference; and navigating the vehicle based on the at least one object identified as the navigational reference.

23. The method of claim 18, further comprising:
detecting a second object within the first field of view based on the first sensor data from the first sensor; and
determining whether the second object is a collision threat for the vehicle based on the detecting the second object.

24. The method of claim 23, further comprising controlling the vehicle to avoid the second object based on the determining.

25. The method of claim 23, wherein the second object is moving relative to the vehicle during the sensing with the first sensor and the sensing with the second sensor.

* * * * *